UNITED STATES PATENT OFFICE.

WILLIAM J. BABB, OF TROY, NEW YORK, ASSIGNOR TO HIMSELF AND WILLIAM T. MASON, OF SAME PLACE.

FIRE-KINDLER.

SPECIFICATION forming part of Reissued Letters Patent No. 10,352, dated July 10, 1883.

Original No. 277,190, dated May 8, 1883. Application for reissue filed June 4, 1883.

*To all whom it may concern:*

Be it known that I, WILLIAM J. BABB, of Troy, in the county of Rensselaer and State of New York, have invented a new and Improved Fire-Kindler, of which the following is a full, clear, and exact description.

The object of my invention is to provide a new and improved fire-lighter for kindling coal-fires, which consists of a mixture of charcoal and corn-cobs saturated with a mixture of a heavy hydrocarbon oil, pitch, or tar, and petroleum or kerosene mixed in the following manner and proportions: One part of charcoal and two parts of corn-cobs broken into small pieces are mixed and saturated with a mixture made of four parts of petroleum or kerosene, one part of heavy hydrocarbon or linseed, cotton-seed, sperm, or fish oil, and one part of tar or pitch. Although no particular size is absolutely essential in the pieces of the charcoal and corn-cobs, they should both be in small pieces, but not ground or powdered.

The above-described mixture of charcoal, corn-cobs, and the liquids is formed into packages of suitable size, and the packages are coated with a preparation of turpentine and oil, and then the packages are packed in suitable vessels or boxes and stamped and labeled.

By means of the above-described fire-kindler heat is gradually obtained which is sufficient to ignite coal. The petroleum or kerosene is ignited by means of a match or taper, and ignites the hydrocarbon oil and pitch or tar, which in turn ignite the cobs, and they ignite the bituminous or anthracite coal.

My improved fire-kindler never fails to ignite coals, ignites them very rapidly, is clean, cheap, and convenient, and saves a great amount of labor. The pitch or tar and heavy hydrocarbon act on each other and give body and intensity to the flame and spread the same, and they do not evaporate and leave the cobs and charcoal, as petroleum or kerosene alone does. The mixture is not compressed, but is put up loosely in cans or paper boxes preferably containing about two quarts. The best way of using the fire-kindler is to place a little coal on the bottom of the grate, put on it the paper package, light it, and cover with coal. It will speedily ignite the coal. On the other hand, if a can is used, pour the mixture over the coal, light, and cover as before.

I am aware that fire-kindlers have been made heretofore which consist of lumps of charcoal saturated with some liquid which facilitates igniting the same, which lumps can then be placed in some material which is thus easily ignited; but I do not claim, broadly, a fire-kindler made in the above manner.

I am also aware that kindlers have heretofore been made of coal or coal-dust covered with inflammable material; also cobs strung on a wire and covered with inflammable material, and also of coke, coal, charcoal, and sawdust saturated with resin and turpentine; but

What I claim as new and my invention is—

A fire-kindling composition consisting of one part of charcoal and two parts of corn-cobs saturated with a mixture of petroleum or kerosene, tar, or pitch, and a heavy hydrocarbon or linseed, cotton-seed, sperm, or fish oil, substantially as described, whereby the petroleum or kerosene, which is ignited by a match, can ignite the hydrocarbon oil and tar or pitch, which in turn ignite the cobs, and they ignite the charcoal, which then ignites the anthracite or bituminous coal, as set forth.

WILLIAM J. BABB.

Witnesses:

WM. J. MACDONALD,

L. J. THIESSEN.